Windle

United States Patent [19]

[11] 3,734,297
[45] May 22, 1973

[54] MODULE FOR REVERSE OSMOSIS APPARATUS

[75] Inventor: William K. Windle, Encinitas, Calif.

[73] Assignee: Universal Water Corporation, San Diego, Calif.

[22] Filed: Feb. 2, 1972

[21] Appl. No.: 222,750

[52] U.S. Cl. ................................. 210/321, 210/433
[51] Int. Cl. .............................................. B01d 31/00
[58] Field of Search .............................. 210/321, 433

[56] References Cited

UNITED STATES PATENTS 3,480,147  11/1969  Kanyuk ................................ 210/321
3,612,282  10/1971  Cheng ............................. 210/433 X

*Primary Examiner*—Frank A. Spear, Jr.
*Attorney*—Clement H. Allen

[57] ABSTRACT

A module useful in reverse osmosis apparatus contains a number of semipermeable membrane elements each enclosed in an individual pressure resistant tube. End members holding the ends of the pressure tubes in a ladder-like configuration, contain removable plugs having channels for directing liquid flow between the ends of pressure tubes. Plugs providing series, parallel or series-parallel flow through the pressure tubes may be inserted in the end members.

4 Claims, 6 Drawing Figures

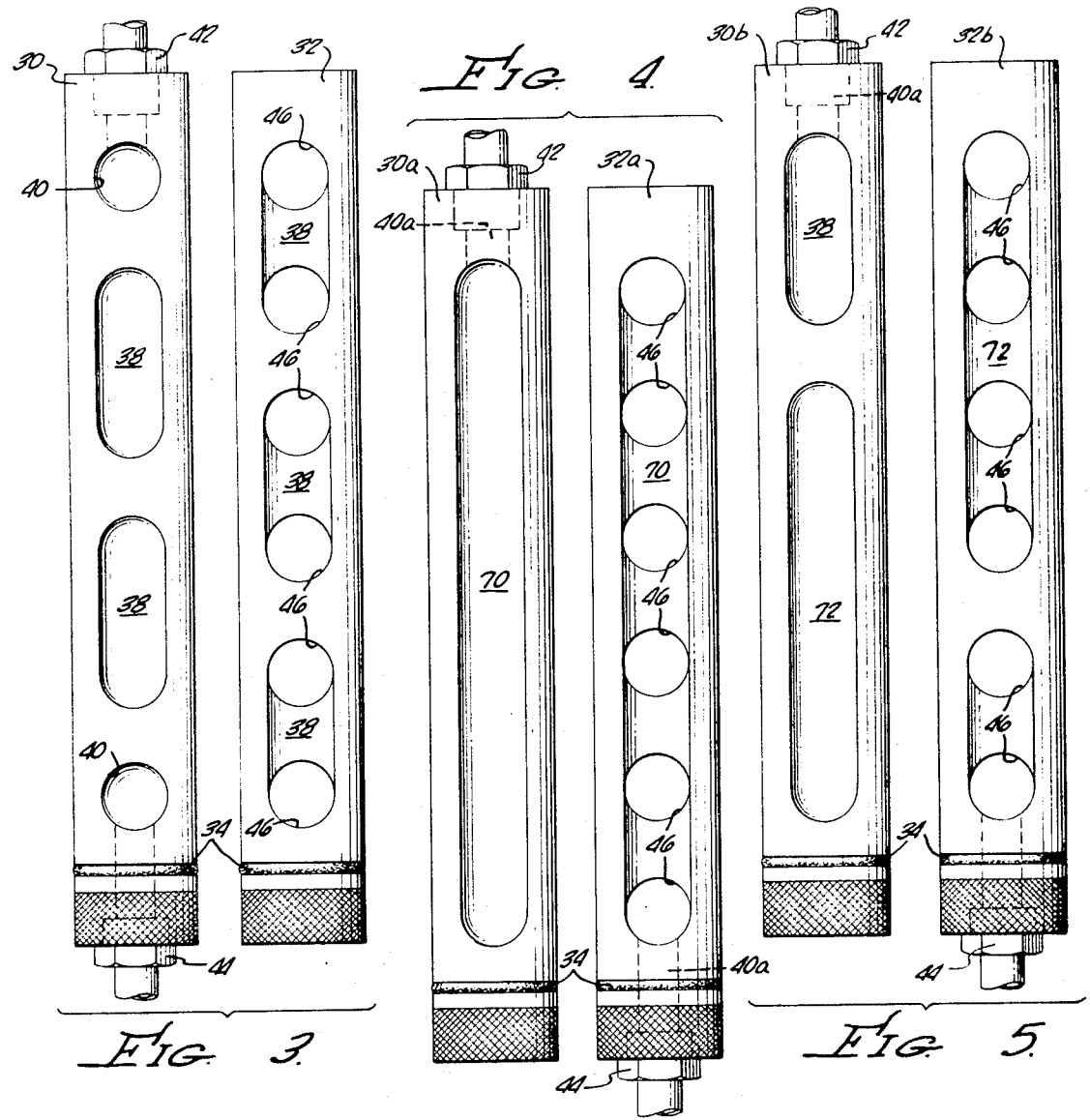
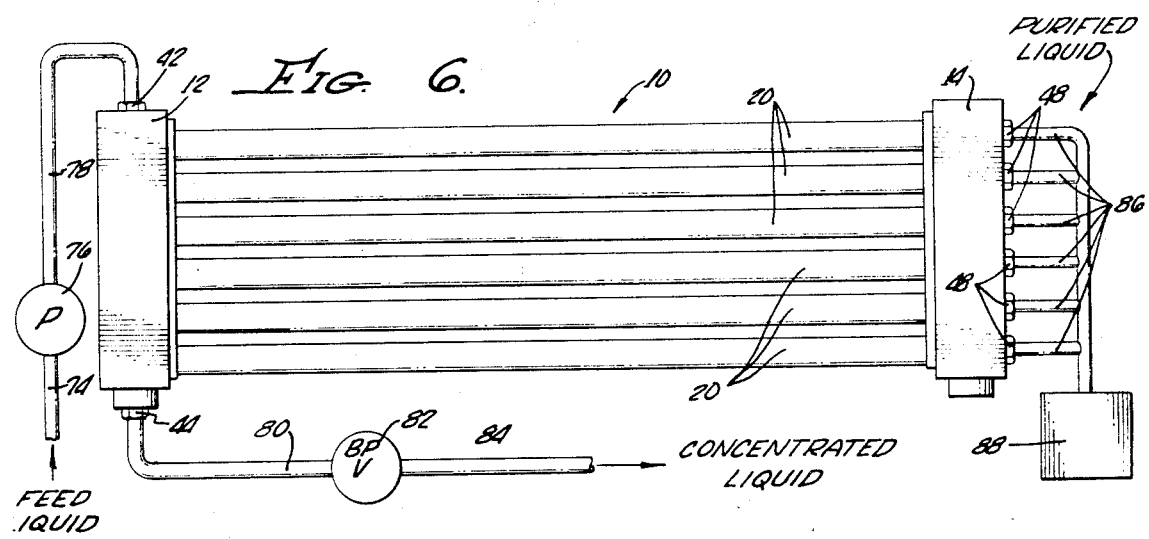

MODULE FOR REVERSE OSMOSIS APPARATUS

BACKGROUND OF THE INVENTION

1. Field of the Invention

This invention relates to a module comprising a plurality of semipermeable membrane elements inside connected connected pressure resistant tubes and adapted for apparatus used in reverse osmosis or ultrafiltration processes.

2. Description of the Prior Art

The prior art has proposed reverse osmosis or ultrafiltration modules comprising connected pressure resistant tubes containing membranes or membrane elements, the flow of feed liquid through these tubes being directed by ducts, ports or connections at the ends of the tubes or in their supporting headers. One arrangement is to connect a number of tubes in parallel clusters of several tubes each, these clusters being connected in series in a module. Or a group of tubes may be arranged all in series or all in parallel. The dominant feature of these designs is that the flow control, if it is part of the module construction, has generally been fixed and inflexible.

In the module of this invention, provision is made for rapid and simple change of the flow pattern in a reverse osmosis module. Thus a module containing six membrane elements, for example in series, can be quickly changed to contain groups of pressure tubes in series-parallel, or all six of the elements in parallel. Thus the problem of providing the desired number of membrane elements in the desired parallel or series arrangement, and rapidly and simply changing this arrangement, when necessary or desirable, is solved.

SUMMARY OF THE INVENTION

Summarized briefly, the module of this invention comprises a plurality of membrane elements each enclosed in an individual pressure resistant tube, (hereinafter also referred to as a "pressure tube"). The opposite ends of the pressure tubes are connected to end members which each contain a bore communicating with the open ends of the pressure tubes connected to that end member. A plug is fitted so as to be slidable in and out of the bore in each end member, and the plug is fabricated with channels which, when the plug is in the bore, will provide connections from end to end of selected pressure tubes, or will connect feed liquid or brine release to or from any or all of the pressure tubes. Each plug is equipped with sealing means such as resilient "o" rings to seal it into the bore in the end member to preserve pressure tightness in the assembly. Plugs may be readily and quickly inserted into the end member bores having channels to provide all series flow, or series-parallel flow with desired groups of pressure tubes, or all parallel flow, as desired.

BRIEF DESCRIPTION OF THE DRAWINGS

Construction and operation of the module of this invention may be more readily understood by reference to the description thereof and to the accompanying drawings in which:

FIG. 3 shows separated side views of the end plugs of the module of FIG. 1 rotated 90° to show more clearly the channels therein.

FIG. 4 shows an alternative embodiment corresponding to the view of FIG. 3 in which the end plugs have channels arranged for parallel flow of the liquid through the module pressure tubes.

FIG. 5 shows an alternative embodiment corresponding to the view of FIG. 3 in which the end plugs have channels arranged for series-parallel flow of the liquid through the module pressure tubes.

FIG. 6 shows a reverse osmosis system employing the module of FIG. 1.

DESCRIPTION OF PREFERRED EMBODIMENTS

Figure 1:
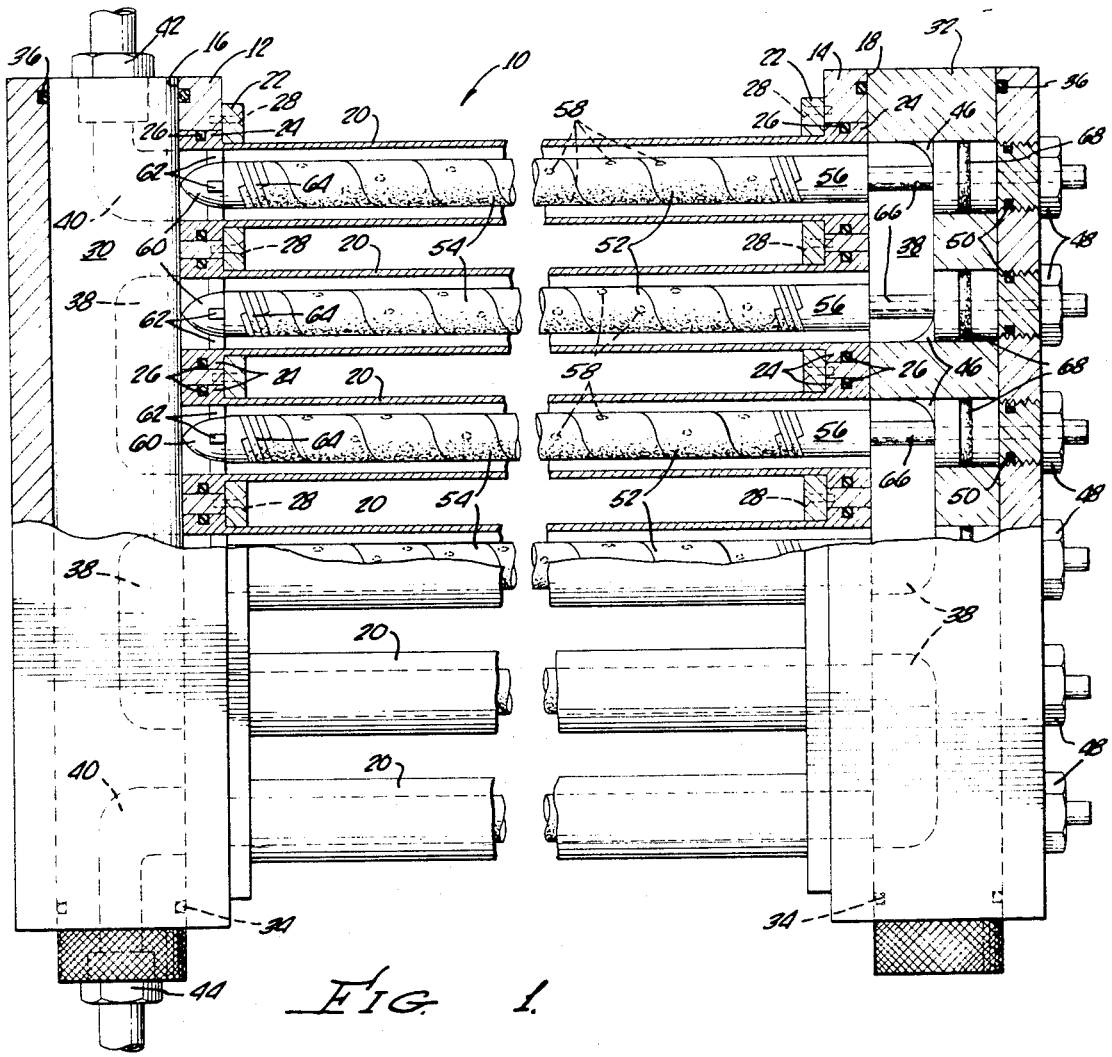
FIG. 1 shows a side view, partly in central cross section, of a module embodying features of this invention in which the pressure tubes are connected for series flow.
Figure 2:
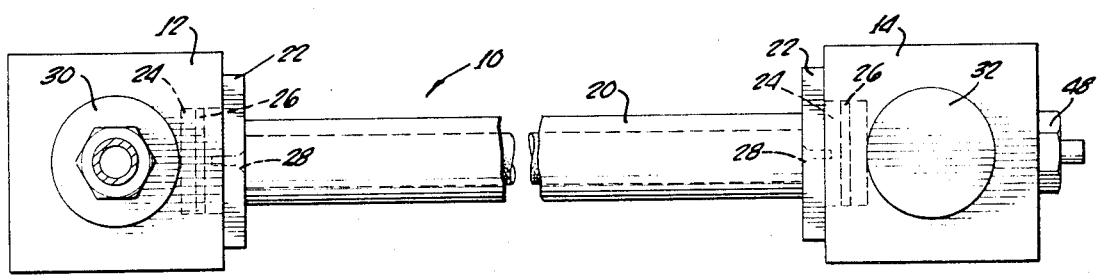
FIG. 2 shows a top view of the module of FIG. 1.

Referring now particularly to FIGS. 1, 2, and 3, the module 10 comprises a pair of end members 12 and 14 having respective bores 16 and 18. Attached to end members 12 and 14 are the ends of a plurality of pressure resistant tubes 20, the attachment being made in the embodiment shown by hold plates 22 which engage the outer shoulder of collars 24 attached to the ends of each pressure tube 20 and which are sealed to end members 12 and 14 by resilient "o" rings 26. Hold plates 22 are maintained firmly in position, holding the ends of pressure tubes 20 connected to the end members 12 and 14 and communicating interiorly with bores 16 and 18, by means of machine screws 28.

Inserted in bores 16 and 18 respectively in end members 12 and 14 are plugs 30 and 32. These are both cylindrical in shape and are sealed similarly to the end members in which they are placed by resilient "o" rings 34 in circumferential grooves in an end portion of plugs 30 and 32, and at the other end are sealed similarly by resilient "o" rings 36 which are placed conventionally in grooves in the walls of the bores 16 and 18. Plugs 30 and 32 are slidable in and out of bores 16 and 18, the arrangement of "o" rings described above enables the plugs to be inserted from the bottom as shown in FIG. 1 almost all the way before the "o" rings 34 engage plug 30 and 32 surfaces for effective sealing. Plugs 30 and 32 are characterized by having channels communicating with the ends of the pressure tube 20. In the case of plug 30 these channels take the form, in the embodiment of FIG. 1, of elongated cross-over channels 38 which connect the ends of adjacent interior pressure tubes 20, and ports 40 which connect the exterior pressure tube ends to feed inlet fitting 42 and brine release fitting 44 which are threaded conventionally into the ends of plug 30 as shown. The other plug, namely 32, is also provided with cross-over channels 38; in this case these are three in number connecting the ends of each adjacent pair of pressure tubes 20. Thus the flow path of liquid through pressure tubes 20 can be traced through inlet fitting 42 in plug 30, then through port 40, then up the outside tube 20, then through a cross-over channel in plug 32, then back and forth through the cross-over channels in plugs 30 and 32, and finally to be released through fitting 44 in plug 30.

Plug 32 is also provided with bores 46 each aligned with one of pressure tubes 20 and communicating with the interior of a purified liquid outlet fitting 48 threaded into the end of end member 14 as shown and each sealed thereto by resilient "o" ring 50.

Inside pressure tubes 20 are arranged membrane elements 52 which are fabricated by helically winding an outer layer of semipermeable membrane strip 54 around a tubular support 56 perforated at intervals as at 58. The left hand end (in the drawings) of support 56 is sealed by tapered plug 60 having spacer fins 62 to maintain central alignment of each element 52 in its pressure tube 20. The overlaps of helically wound membrane plugs 54 are sealed as by an adhesive and their ends may be sealed to supports 56 by tape wrappings 64.

The membrane wrapping 54 may be underlaid with a helically wound layer of porous fabric such as nylon cloth to provide better lateral transport of purified liquid passing through the membrane to perforations 58 in support memers 56. Details of the design and construction of such helically wound membrane elements are more particularly described and claimed in U.S. Pat. No. 3,578,175 issued May 11, 1971.

To the right hand end (in the drawings) of each support 56 is sealingly attached a bored extension 66 having a narrowed section where it passes through channel 38 and an enlarged diameter at its extremity to fit into bore 46 in plug 32, being sealed thereto by resilient "o" ring 68. The bores in support extensions 66 communicate with the interiors of purified liquid outlet fittings 48. The flow of purified liquid may be traced through the semipermeable membrane 54 and its fabric underlay to perforations 58 and into the interior of each tubular support 56, thence through its bored extension 66 and out through purified water outlet fitting 48.

In FIG. 3 are shown the plugs 30 and 32 separated from end members 12 and 14 and rotated 90° to more clearly show the channels therein. Elongated double channels 38 will be seen in the central portion of plug 30 and ports 40 nearer its ends as previously described. In plug 32 three elongated double channels 38 are shown each for connecting a pair of the ends of tubes 20 with bores 46 arranged so that they will align with tubes 20 when plug 32 is inserted in end member 14. The flow in the arrangement described employing the plugs of FIG. 3 will be with all tubes 20 in series.

In FIG. 4 the plugs identified as 30a and 30b are modified to provide flow with all of tubes 20 in parallel. In plug 30a which can, as will be understood, replace plug 30 in the module end member 12 of FIG. 1, there is arranged a six-long channel 70 which connects the ends of all six pressure tubes 20 and which communicates with inlet fitting 42 through modified port 40a. Plug 32a which can replace plug 32 in end member 14 of FIG. 1 is provided also with six-long channel 70 connecting all the other ends of pressure tubes 20 and which communicates with outlet fitting 44 through another modified port 40a. Plug 32a is also provided with bores 46 in which are to be sealed the ends 66 of membrane elements 52 as previously described for the basic embodiment.

In FIG. 5 the plugs identified as 30b and 32b are modified to provide series-parallel flow with three parallel connected pairs of tubes 20 in series. In plug 30b which can, as will be understood, replace plug 30 in the end member 12 of FIG. 1, there are arranged a double channel 38 and a longer quadruple channel 72, which connects the ends of the other four pressure tubes 20. Connection of the upper double channel to inlet fitting 42 is the same as previously described. In plug 32b, which can replace plug 32 in the end member 14 of FIG. 1, are an upper quadruple channel 72 and a lower double channel 38 which is also connected to outlet fitting 44 as previously described.

In FIG. 6 is shown a reverse osmosis system employing the module of this invention. Feed liquid is introduced at 74 to high pressure pump 76 from which it is transferred through pipe 78 to inlet fitting 42 of module 10. The liquid flows through pressure tubes 20 around membrane elements 52 and is released through outlet fitting 44 which is connected by pipe 80 to back pressure valve 82 which releases concentrated liquid at 82 while maintaining operating pressure in module 10. Purified liquid released through fittings 48 is transferred by tubes 86 and collected in container 88.

In operation, the module 10 of this invention may be connected to a high pressure pump 76 and back pressure valve 82 as shown in FIG. 6. Feed liquid which may, for example, be brackish water of 3,000 ppm TDS (Total Dissolved Solids) is introduced to pump 76 at 74, and the pump raises the feed liquid pressure to 600 psig, at which pressure it enters the inlet 42 of module 10 at a rate of 3 gallons per minute. Passing through module 10 purified water is extracted by reverse osmosis and is collected in container 88 while the concentrated liquid or brine is released through back pressure valve 82 which is adjusted to maintain a back pressure of 575 pounds, the difference between this and the inlet pressure being, of course, the pressure drop across the module. Brine or concentrated liquid is released at 84. The purified water collected at 88 will contain, for example, 200 ppm TDS while the brine released at 84 will contain 5,800 ppm TDS.

The design of the module of this invention is advantageous for easy cleaning and simple replacement of membrane elements as well as change of flow through the pressure tubes by changing plugs in the bored end members. The membrane elements can be removed readily by removing product outlet fittings 48 and the membrane elements withdrawn individually as will be apparent. If it is desired to disassemble the unit completely, the screws 28 may be loosened and hold plates 22 removed and the pressure tubes may then be separated from end members 12 and 14. This procedure is simple and advantageous if the module is employed for testing purposes and must be cleaned thoroughly between each run, or if, biological or food products are being processed and sanitary conditions are essential.

I claim:

1. A reverse osmosis module comprising a plurality of membrane elements enclosed in individual pressure resistant tubes and having means for supplying feed liquid to the interior of said tubes, means for releasing concentrated liquid from said tubes and means for collecting purified liquid from the interiors of said membrane elements, in which the improvements comprise:
   a. a pair of bored end members;
   b. a plurality of said pressure resistant tubes containing membrane elements, having ends sealingly attached to and communicating with said end members;
   c. plugs slidable in and out of the bores in said bored end members in sealing engagement therewith and having channels communicating with selected ends of said pressure resistant tubes;
   d. means for introducing feed liquid into said pressure resistant tubes through one of said channels in the plug in one of said bored end members;
   e. means for releasing concentrated liquid from said pressure resistant tubes through another of said channels in the plug in one of said bored end members; and, f. means for collecting purified liquid from the said membrane elements, said means passing through one of said bored end members.

2. A module according to claim 1 in which the plugs in said bored end members have channels communicating with ends of selected of said pressure resistant tubes to provide series flow of liquid through said pressure resistant tubes.

3. A module according to claim 1 in which the plugs in said bored end members have channels communicating with end of selected of said pressure resistant tubes to provide parallel flow of liquid through said pressure resistant tubes.

4. A module according to claim 1 in which the plugs in said bored end members have channels communicating with ends of selected of said pressure resistant tubes to provide series-parallel flow of liquid through said pressure resistant tubes.

* * * * *